(12) United States Patent
Adachi et al.

(10) Patent No.: US 11,872,773 B2
(45) Date of Patent: Jan. 16, 2024

(54) METHOD FOR PRODUCING FIBER-REINFORCED PLASTIC

(71) Applicant: Toray Industries, Inc., Tokyo (JP)

(72) Inventors: Kentaro Adachi, Ehime (JP); Yuzo Fujita, Ehime (JP); Takuya Karaki, Ehime (JP)

(73) Assignee: Toray Industries, Inc., Tokyo (JP)

( * ) Notice: Subject to any disclaimer, the term of this patent is extended or adjusted under 35 U.S.C. 154(b) by 762 days.

(21) Appl. No.: 16/482,436

(22) PCT Filed: Jan. 19, 2018

(86) PCT No.: PCT/JP2018/001529
§ 371 (c)(1),
(2) Date: Jul. 31, 2019

(87) PCT Pub. No.: WO2018/142963
PCT Pub. Date: Aug. 9, 2018

(65) Prior Publication Data
US 2020/0247071 A1    Aug. 6, 2020

(30) Foreign Application Priority Data
Feb. 2, 2017    (JP) .................................. 2017-017327

(51) Int. Cl.
*B29C 70/34*    (2006.01)
*B29C 43/34*    (2006.01)
(Continued)

(52) U.S. Cl.
CPC .............. *B29C 70/34* (2013.01); *B29C 43/34* (2013.01); *B29C 65/022* (2013.01); *B29C 65/18* (2013.01);
(Continued)

(58) Field of Classification Search
None
See application file for complete search history.

(56) References Cited

U.S. PATENT DOCUMENTS 9,314,990 B2     4/2016  Sato et al.
2014/0272243 A1*  9/2014  Sato ........................ B29C 65/18
                                                          428/54

FOREIGN PATENT DOCUMENTS

JP     H1190986 A    *  4/1999
JP     2008207544 A      9/2008
(Continued)

OTHER PUBLICATIONS

Machine English translation of JP-5292972-B2, Accessed Jan. 11, 2022 (Year: 2013).*

(Continued)

*Primary Examiner* — Jacob T Minskey
*Assistant Examiner* — Adrianna N Konves
(74) *Attorney, Agent, or Firm* — RatnerPrestia

(57) ABSTRACT

Provided is a method for producing a fiber-reinforced plastic having high mechanical properties and high productivity during molding of a complicated shape. A method for producing a fiber-reinforced plastic using a sheet substrate A is provided, the sheet substrate A being a substrate including one or more sheets of incised prepreg a, the incised prepreg a being a prepreg including unidirectionally oriented reinforcing fibers and a resin and having a plurality of incisions dividing the reinforcing fibers formed in the prepreg, wherein the method for producing a fiber-reinforced plastic includes a placement step (A) of placing a plurality of sheet (Continued)

(a)    (b)

substrates A in a mold such that each of the sheet substrates A forms an overlapping portion in which the sheet substrate A overlaps one or more other sheet substrates A and a non-overlapping portion in which the sheet substrate A does not overlap any other sheet substrates A, and a molding step of heating and pressing the plurality of sheet substrates A, and the total area of the overlapping portion and the non-overlapping portion is 50 to 100% relative to the area of a mold surface.

13 Claims, 5 Drawing Sheets

(51) Int. Cl.
    *B29C 65/02*     (2006.01)
    *B29C 65/18*     (2006.01)
(52) U.S. Cl.
    CPC .................. *B29C 2791/001* (2013.01); *B29C 2793/0009* (2013.01)

(56) References Cited

FOREIGN PATENT DOCUMENTS

| | | | |
|---|---|---|---|
| JP | 2009292002 A | 12/2009 | |
| JP | 2010018724 A | 1/2010 | |
| JP | 2010030193 A | 2/2010 | |
| JP | 5292972 B2 * | 9/2013 | ............. B29B 15/08 |
| JP | 2014172267 A | 9/2014 | |
| JP | 2014172334 A | 9/2014 | |
| JP | 2015051630 A | 3/2015 | |
| JP | 2017119432 A | 7/2017 | |

OTHER PUBLICATIONS

Machine English translation of JPH1190986A, Accessed Apr. 14, 2023 (Year: 1999).*
International Search Report and Written Opinion for International Application No. PCT/JP2018/001529, dated Mar. 6, 2018—6 pages.

* cited by examiner

METHOD FOR PRODUCING FIBER-REINFORCED PLASTIC

CROSS REFERENCE TO RELATED APPLICATIONS

This is the U.S. National Phase application of PCT/JP2018/001529, filed Jan. 19, 2018, which claims priority to Japanese Patent Application No. 2017-017327, filed Feb. 2, 2017, the disclosures of these applications being incorporated herein by reference in their entireties for all purposes.

FIELD OF THE INVENTION

The present invention relates to a method for producing a fiber-reinforced plastic having high productivity and high mechanical properties.

BACKGROUND OF THE INVENTION

Fiber-reinforced plastics made of reinforcing fibers and a resin have high specific strength and high specific modulus as well as excellent mechanical properties and high functional properties such as weather resistance and chemical resistance, and accordingly, fiber-reinforced plastics have received a wide attention as materials for industrial use such as structural elements of aircraft, spacecraft, motor vehicles, railways, ships, electric appliances, and sport gear, and their demands are increasing year by year. In recent years, with the expansion of the application range of fiber-reinforced plastics, fiber-reinforced plastics having more complicated shapes have been required.

As a method of producing a fiber-reinforced plastic having a complicated shape, there is a method of obtaining a fiber-reinforced plastic by joining and integrating intermediate substrates prepared by impregnating reinforcing fibers with an uncured resin. However, when the reinforcing fibers contained are continuous fibers, such as prepregs commonly used as intermediate substrates, shape conformability to a mold is poor at the time of molding and it is difficult to conform a joining portion to a desired shape. In addition, sufficient mechanical properties may not be obtained at the joining portion. For this reason, there has been devised a method in which discontinuous reinforcing fibers randomly oriented are used as reinforcing fibers contained in an intermediate substrate (for example, Patent Document 1). However, in the case of a substrate in which discontinuous fibers are randomly oriented as in Patent Document 1, the fiber content is low and the mechanical properties are poor, so that incised prepregs as disclosed in Patent Document 2 have been devised. By extending an incised prepreg sheet cut in somewhat conformity with a mold by press molding, fiber-reinforced plastics having a rugged shape can be produced.

PATENT DOCUMENTS

Patent Document 1: Japanese Patent Laid-open Publication No. 2014-172334
Patent Document 2: Japanese Patent Laid-open Publication No. 2008-207544

SUMMARY OF THE INVENTION

However, in the case where the reinforcing fibers contained in the intermediate substrate are discontinuous fibers randomly oriented as disclosed in Patent Document 1, since distribution unevenness or orientation unevenness of the randomly oriented discontinuous fibers inevitably occur, so that mechanical properties deteriorate or a great variation in the values thereof occurs and, as a result, rigidity or strength decrease in a joining portion in some occasions.

In the case of Patent Document 2, it is necessary to cut into a shape in conformity with a mold, so that it takes time and effort and the yield is low and, as a result, the productivity is poor.

Accordingly, an object of the present invention is to provide a method for productively producing a fiber-reinforced plastic having an excellent complicated shape and being capable of exhibiting high mechanical properties.

To solve this problem, the present invention provides the following method for producing a fiber-reinforced plastic.

A method for producing a fiber-reinforced plastic using a sheet substrate A, the sheet substrate A being a substrate including one or more sheets of incised prepreg a, the incised prepreg a being a prepreg including unidirectionally oriented reinforcing fibers and a resin and having a plurality of incisions dividing the reinforcing fibers formed in the prepreg, the method for producing a fiber-reinforced plastic including a placement step (A) of placing a plurality of sheet substrates A in a mold such that each of the sheet substrates A forms an overlapping portion in which the sheet substrate A overlaps one or more other sheet substrates A and a non-overlapping portion in which the sheet substrate A does not overlap any other sheet substrates A, and a molding step of heating and pressing the plurality of sheet substrates A, and a total area of the overlapping portion and the non-overlapping portion is 50 to 100% relative to the area of a mold surface.

According to the present invention, it is possible to provide a method for productively producing a fiber-reinforced plastic having a complicated shape and high mechanical properties.

DETAILED DESCRIPTION OF EMBODIMENTS OF THE INVENTION

The present inventors diligently studied in order to provide a production method capable of productively producing a fiber-reinforced plastic having a complex shape and being capable of exhibiting high mechanical properties. Then, such a problem has been solved by devising a method for producing a fiber-reinforced plastic using a mold, the method including a placement step (A) of placing a plurality of sheet substrates A in a mold such that each of the sheet substrates A forms an overlapping portion in which the sheet substrate A overlaps one or more other sheet substrates A and a non-overlapping portion in which the sheet substrate A does not overlap any other sheet substrates A, and a molding step of heating and pressing the plurality of sheet substrates A as will be described later. By cutting sheet substrates A into simple shapes, placing a sufficient amount of them on a mold while allowing an overlapping portion in which a plurality of sheet substrates A overlap, and integrating them by heating and pressing, it is possible to productively produce a fiber-reinforced plastic being capable of exhibiting high mechanical properties while having a complicated shape. A complicated shape refers to a shape having a three-dimensional shape. The factors for forming the three-dimensional shape include, but are not limited to, surface irregularities, bending in the out-of-plane direction of the substrate lamination surface, thickness variation, ribs, bosses, etc. Further, even in the case of a two-dimensional shape, it is included in the complicated shape if its front view produced by projecting the member has five or more corners on the edge thereof.

The sheet substrate A in the present invention is a sheet-like substrate including one or more incised prepregs a. The incised prepreg a is a prepreg including unidirectionally oriented reinforcing fibers and a resin and having a plurality of incisions dividing the reinforcing fibers. The sheet substrate A is a sheet-like substrate including one or more incised prepregs a as described above, and it is preferably a sheet-like substrate including a plurality of incised prepregs a laminated together.

Typical lamination structures of the incised prepregs a constituting the sheet substrate A may be a quasi-isotropic lamination structure like $[+45°/0°/-45°/90°]_{2S}$ where the fiber direction of the reinforcing fibers is 0° and a cross-ply lamination structure like $[0°/90°]_2$, but not limited to those and the incised prepregs a may be arbitrarily laminated depending on the application. In the placement step (A), a plurality of sheet substrates A differing in the lamination structure of incised prepregs a may be placed, but in consideration of mechanical homogeneity, it is preferable to place a plurality of sheet substrates A identical in the lamination structure of incised prepregs a in the placement step (A).

Figure 1:
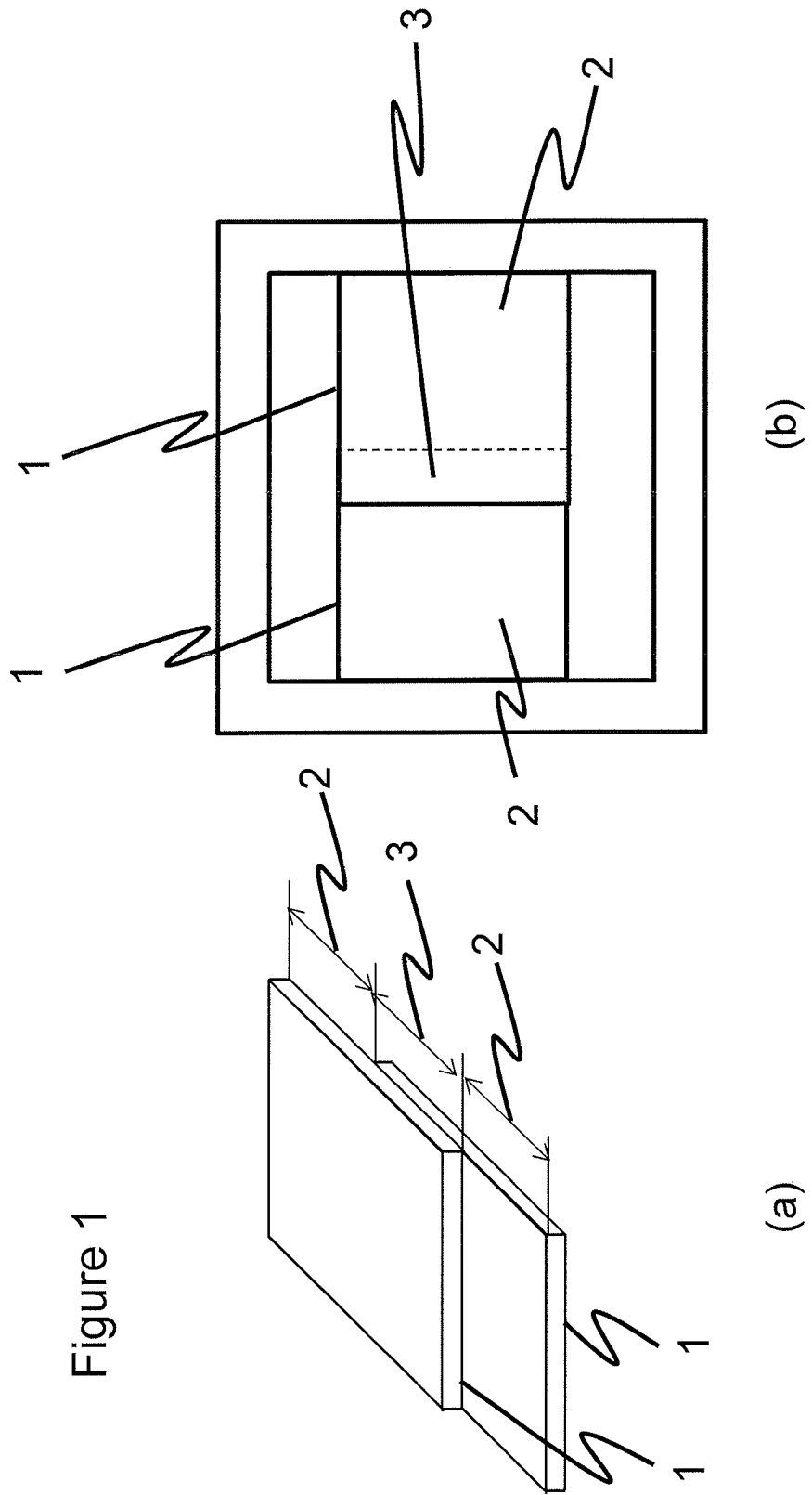
FIG. 1 is an example of a placement of a sheet substrate A.

The placement step (A) in the present invention is a step of placing a plurality of sheet substrates A (sign 1) in a mold such that each of the sheet substrates A forms an overlapping portion (sign 3) in which the sheet substrate A overlaps one or more other sheet substrates A and a non-overlapping portion (sign 2) in which the sheet substrate A does not overlap any other sheet substrates A as shown in FIG. 1. Each of the sheet substrates A overlaps one or more other sheet substrates A such that, when the sheet substrates A are rectangular, each of the sheet substrates A is placed with one side thereof overlapping another sheet substrate A by about 1 to 5 cm. By overlapping a plurality of sheet substrates A at least partly, a complicated joining surface is formed between sheet substrates A during the molding step described later, so that it is possible to improve mechanical properties at a joining portion.

The molding step in the present invention is a step of heating and pressing substrates including a plurality of sheet substrates A placed in a mold. That is, in the molding step, in order to integrate the plurality of sheet substrates A placed in the placement step (A), heating and pressing thereof are performed and a fiber-reinforced plastic having a complicated shape is thereby produced. The means for heating and pressing in the molding step may be, for example, press molding.

When executing the placement step (A), the total area of the overlapping portion and the non-overlapping portion formed by the plurality of sheet substrates A is preferably adjusted to 50 to 100% relative to the area of a mold surface. The area of a mold surface herein means the surface area of the molding surface of the mold. That intends to fully fill the inside of the mold with the substrates during the molding step, and that makes it possible to produce a fiber-reinforced plastic having a complicated shape. Usually, when attempting to form a large complicated member larger than 0.5 m² using an incised prepreg laminate having no joining portions, flow is insufficient because only the edge portions of the substrate are actually easy to flow, so that it is difficult to flow the substrate to edges of the mold and mold it into a desired shape. On the other hand, by placing substrates in a plurality of portions, an increased number of edges thereof easy to flow are formed, and the substrates slip with each other at the time of pressing, so that they are loaded to edges and a complicated shape can be formed. However, when the total area of the overlapping portion and the non-overlapping portion is smaller than 50% relative to the area of the mold surface, it becomes difficult to load the substrates into the mold due to slippage or flow. Therefore, it is preferable that the total area of the overlapping portion and the non-overlapping portion be 50 to 100% relative to the area of the mold surface.

In a possible preferred embodiment of the present invention, in the placement step (A), the ratio of the total area of the overlapping portion to the total area of the non-overlapping portion ("the total area of the overlapping portion"/"the total area of the non-overlapping portion") is 0.05 to 0.8. If the area of the non-overlapping portion is too small, the area of the joining portion between the sheet substrates A becomes small, resulting in a low strength of the joining portion. In contrast, if the area of the overlapping portion is too large, the sheet substrates A may not conform with a complicated shape and a resulting fiber-reinforced plastic may be blurred. Therefore, it is important to place the sheet substrates A in the mold such that the proportion of the area of the overlapping portion to the area of the non-overlapping portion is appropriate. A further preferable ratio of the total area of the overlapping portion to the total area of the non-overlapping portion is 0.1 to 0.6.

In the present invention, since the reinforcing fibers contained in the sheet substrates A are not random in orientation angle and prepregs in which reinforcing fibers are unidirectionally oriented are used, no orientation unevenness or distribution unevenness of the reinforcing fibers occurs and fiber-reinforced plastics having high mechanical properties can be produced. When the prepregs constituting the sheet substrates A are unidirectional prepregs having no incisions, the substrates cannot conform in shape during the molding step. This leads to generate a puddle of resin or wrinkles between the mold and the unidirectional prepreg, and therefore mechanical properties cannot be fully utilized. Thus, it is preferable to improve the shape conformability by employing incised prepregs in which incisions are formed. However, the mechanical properties of an incised prepreg vary depending on the shape or the arrangement pattern of the incisions. For example, the shorter the length of incisions (hereinafter sometimes referred to as the incision length) or the longer the length of reinforcing fibers divided by incisions (hereinafter sometimes referred to as the fiber length), the lower the knock-down from the mechanical properties of the original prepreg is and the higher the mechanical properties it has.

Therefore, in the incised prepregs a in the sheet substrates A in the present invention, it is preferable that the average length xa (mm) of the incisions and the average length ya (mm) of the reinforcing fibers divided by the incisions satisfy ya>6.0xa+10 (hereinafter referred to as condition 1). Condition 1 means that it is preferable that the longer the average length xa of the incisions, the longer the average length ya of the reinforcing fibers, and when the average length ya of the reinforcing fibers is short, it is preferable that the average length xa of the incisions is shorter. When the condition 1 is satisfied, it is preferable especially that ya be 20 mm or more because high mechanical properties are exhibited.

The average length of incisions in the present invention means the average value of the lengths of all the incisions formed in an incised prepreg, but since it is impractical to actually measure the lengths of all the incisions, the average value determined from the values measured using an image taken by photographing the incised prepreg using an imaging device such as a digital microscope is taken as the average length of the incisions. The pattern of incisions can be extracted by connecting the ends of the same incision on the obtained image by a line segment. Then, the length of the line segment is taken as the length of the incision, the lengths of 10 incisions in total are measured, and the average value thereof is taken as the average length of incisions. Incisions may be either linear or curved, but when an incision is curved, the length of the line segment connecting the ends of the incision is taken as the length of the incision.

Similarly, the average length of reinforcing fibers in the present invention also means the average value of the lengths of all the reinforcing fibers in an incised prepreg, but since it is impractical to actually measure the lengths of all the reinforcing fibers, the average value determined from the values measured using an image taken by photographing by use of an imaging device such as a digital microscope in the same manner as for the average length of incisions is taken as the average length of the reinforcing fibers. On the image, for each of two incisions adjacent in the fiber direction of the reinforcing fibers, the ends of the same incision are connected by a line segment, and an incised pattern is extracted. Then, the distance between the line segments parallel to the fiber direction of the reinforcing fiber is taken as the length of the reinforcing fiber, and the length of the reinforcing fiber is measured for 10 line segments in total, and the average value thereof is taken as the average length of the reinforcing fiber.

In a preferred embodiment of the present invention, the number of the sheet substrates A to be placed on a mold in the placement step (A) is four or more. When the fiber-reinforced plastic to be molded is relatively large, the workability can be improved by placing the sheet substrates A after divided them into a size smaller than 0.5 m² which is easy to handle manually. If the number of the sheet substrates A to be placed in a mold in the placement step (A) is larger than 10, the time and effort for placing the sheet substrates A increases, and therefore the number of the sheet substrates A to be placed in the mold in the placement step (A) is preferably 10 or less.

In a preferred embodiment of the present invention, the shape of the sheet substrates A is preferably square or rectangular. By making the shape of the sheet substrates A square or rectangular, substrates can be produced with high yield when cutting prepregs or sheet substrates A. In addition, the time required for the preparation of substrates can be shortened, leading to improvement in productivity. More preferably, the sheet substrates A are rectangular.

In a preferred embodiment of the present invention, incised prepregs a each having a plurality of holes may be used. By forming a plurality of holes in each incised prepreg a, when the sheet substrates A are heated and pressed in the molding step, the sheet substrates A flow also toward the centers of the holes and, as a result, it is possible to suppress unevenness in the overlapping portion of the sheet substrates A even when molding them at a lower pressure. The size of the holes is not particularly limited, but it is preferable that the holes be formed to have an average radius of 1 to 20 mm. More preferably, the average radius of the holes is 5 to 10 mm. As a method of forming holes in an incised prepreg a, the holes may be bored using a cutter or the holes may be formed by punching the prepreg using a blade. Furthermore, in the case of using an incised prepreg a having a plurality of holes as the incised prepreg a, the shape of the holes is preferably circular.

Furthermore, when using an incised prepreg a having a plurality of holes as the incised prepreg a, it is preferable to use an incised prepreg a in which the total area of the holes in the incised prepreg a accounts for 10 to 50% in 100% of the area of the incised prepreg a including the holes. By using the incised prepreg a having such a hole, the sheet substrates A become substrates flexible in thickness change, and it becomes easy to suppress the unevenness of the surface of the overlapping portion. Examples of the method of arranging holes in an incised prepreg a include a method of arranging the holes randomly and a method of arranging the holes such that the distances between the centers of adjacent holes are constant.

Preferred embodiments of the present invention include an embodiment where sheet substrates A are placed such that, of the two sheet substrates A forming the overlapping portion by overlapping together, the fiber direction of the reinforcing fibers in the incised prepreg a located on the surface on the overlapping portion of one sheet substrate A differed from the fiber direction of the reinforcing fibers in the incised prepreg a located on the surface of the overlapping portion of the other sheet substrate A and both the fiber directions intersected. That, of the two sheet substrates A, the fiber direction of the reinforcing fibers in the incised prepreg a located on the surface on the overlapping portion of one sheet substrate A differed from the fiber direction of the reinforcing fibers in the incised prepreg a located on the surface of the overlapping portion of the other sheet substrate A and both the fiber directions intersected means the case where in the two incised prepregs a forming the overlapping portion, of the angles formed by the fiber direction of the reinforcing fibers of one incised prepreg a and the fiber direction of the reinforcing fibers of the other incised prepreg a, the smaller angle is 5° or more. It is preferable that the fiber directions of the reinforcing fibers of the two incised prepregs a forming the overlapping portion be different because the reinforcing fibers included in the two sheet substrates A are entangled in a complicated manner at the time of molding, so that the strength of the joining portion is enhanced.

Figure 2:
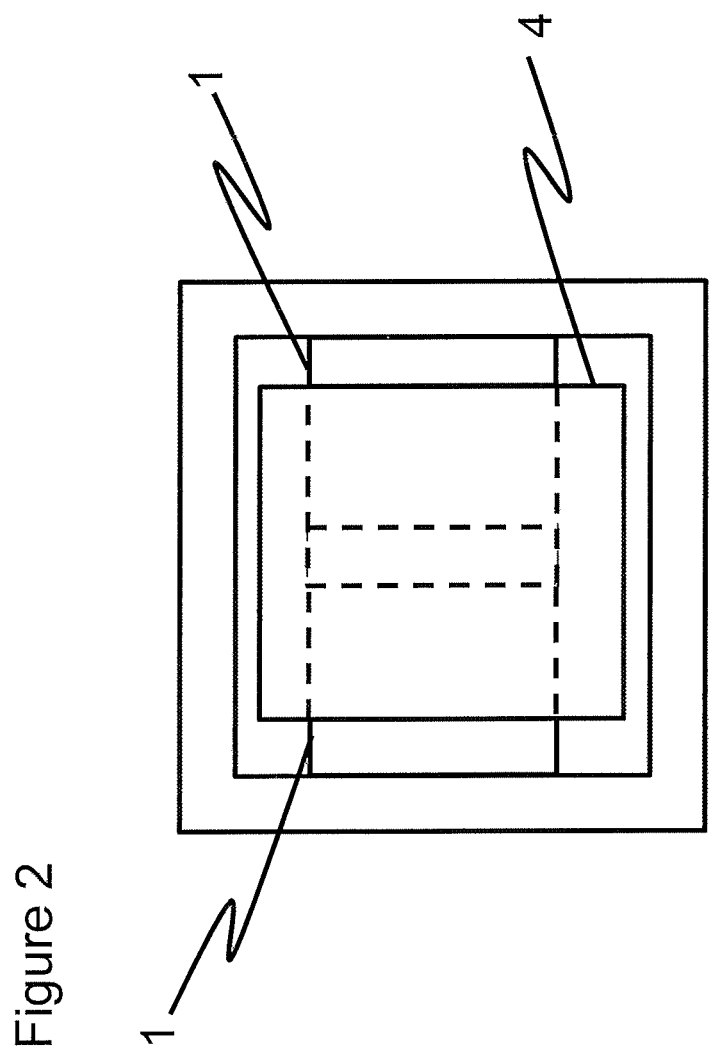
FIG. 2 is an example of a placement of a sheet substrate A and a sheet substrate B or a sheet substrate C.

In a preferred embodiment of the present invention, a placement step (B) of placing a sheet substrate B in the mold may be included in addition to the placement step (A) and the molding step. The sheet substrate B is a substrate having randomly oriented reinforcing fibers and a resin. Examples of such a sheet substrate B include a substrate in which reinforcing fiber bundles having a length of about 10 to 50 mm are randomly arranged, such as an SMC (sheet molding compound) and a substrate in which individual fibers are randomly arranged. The amount of the sheet substrate B charged into the mold may be adjusted by appropriately laminating sheet substrates B according to the volume of the fiber-reinforced plastic to be molded. That is, the placement step (B) of the present invention is a step of placing a sheet substrate B (sign 4) in a mold as shown in FIG. 2, and the number and size of the sheet substrate B to be used in the placement step (B) may be appropriately chosen according to the object to be molded. A sheet substrate B in which discontinuous fiber bundles are randomly oriented exhibits high flowability at the time of heating and pressing, and by placing the sheet substrate B in the mold, the sheet substrate B is loaded to the edges of the mold during the molding step, and it becomes possible to produce a fiber-reinforced plastic conforming with the shape of the mold. As a result of the flowing of the sheet substrate B, the irregularities generated in an overlapping portion of the sheet substrates A can be filled, so that a joining portion with a flat surface can be obtained. That is, the present invention including the placement step (B) of placing the sheet substrate B in the mold is characterized by heating and pressing the sheet substrate B as well in the molding step of heating and pressing the plurality of sheet substrates A. In the present invention including the placement step (B) of placing the sheet substrate B in the mold, it is preferable that the incised prepregs a included in the sheet substrates A satisfy the condition 1 described above.

In a preferred embodiment of the present invention, a placement step (C) of placing a sheet substrate C in the mold may be included in addition to the placement step (A) and the molding step. The sheet substrate C is a sheet substrate having one or more incised prepregs c. The incised prepreg c is a prepreg including unidirectionally oriented reinforcing fibers and a resin and having a plurality of incisions dividing the reinforcing fibers, and it preferably satisfies the condition 2 described below.

The sheet substrate C is a substrate including one or more incised prepregs c as described above, and it is preferably a sheet-like substrate including a plurality of incised prepregs c laminated together. Typical lamination structures of the incised prepregs c constituting the sheet substrate C may be a quasi-isotropic lamination structure like $[+45°/0°/-45°/90°]_{2S}$ where the fiber direction of the reinforcing fibers is 0° and a cross-ply lamination structure like $[0°/90°]_2$, but not limited to those and the incised prepregs c may be arbitrarily laminated depending on the application.

Preferably, the incised pattern of the incised prepreg c is an incised pattern opposite to that of the incised prepreg a for which mechanical properties are important in order to provide the incised prepreg c with flowability sufficient for loading it to edges of a mold having a complicated shape. Therefore, in the present invention including the placement step (C) of placing the sheet substrate C on the mold, it is preferable in the incised prepregs c that the average length xc (mm) of the incisions and the average length yc (mm) of the reinforcing fibers divided by the incisions satisfy yc≤6.0xc+10 (hereinafter referred to as condition 2). When the condition 2 is satisfied, it is preferable especially that yc be smaller than 20 mm especially in order to improve flowability.

The placement step (C) in the present invention is a step of placing a sheet substrate C (sign 4) in a mold as shown in FIG. 2, and the number and size of the sheet substrate C to be used in the placement step (C) as in the placement step (B) may be appropriately chosen according to the object to be molded. By placing the sheet substrate C having high flowability in the mold, the sheet substrate C is loaded to the edges of the mold during the molding step, and it becomes possible to produce a fiber-reinforced plastic conforming with the shape of the mold. As a result of the flowing of the sheet substrate C, the irregularities generated in an overlapping portion of the sheet substrates A can be filled, so that a joining portion with a flat surface can be obtained. That is, the present invention including the placement step (C) of placing the sheet substrate C in the mold is characterized by heating and pressing the sheet substrate C as well in the molding step of heating and pressing the plurality of sheet substrates A. In the present invention including the placement step (C) of placing the sheet substrate C in the mold, it is preferable that the incised prepregs a included in the sheet substrates A satisfy the condition 1 described above.

In the present invention, the reinforcing fibers to be applied to the sheet substrate A, the sheet substrate B, and the sheet substrate C, that is, the reinforcing fibers in the incised prepreg a, the reinforcing fibers in the sheet substrate B, and the reinforcing fibers in the incised prepreg c are not particularly limited, and they may be glass fibers, Kevlar fibers, carbon fibers, graphite fibers, boron fibers, or the like. Different reinforcing fibers may be used for the sheet substrate A (the incised prepreg a), the sheet substrate B, and the sheet substrate C (the incised prepreg c). Among these, carbon fibers are preferable from the viewpoint of specific strength and specific elastic modulus.

The resin with which the reinforcing fibers are to be impregnated, that is, the resin in the incised prepreg a, the resin in the sheet substrate B, and the resin in the incised prepreg c are not particularly limited and may be either a thermoplastic resin or a thermosetting resin. Different resins may be used for the sheet substrate A (the incised prepreg a), the sheet substrate B, and the sheet substrate C (the incised prepreg c).

Examples of the thermoplastic resin include polyamide (PA), polyacetal, polyacrylate, polysulfone, ABS, polyester, acryl, polybutylene terephthalate (PBT), polycarbonate (PC), polyethylene terephthalate (PET), polyethylene, polypropylene, polyphenylene sulfide (PPS), polyether ether ketone (PEEK), polyether imide (PEI), polyether ketone ketone (PEKK), liquid crystal polymers, polyvinyl chloride, fluororesins, such as polytetrafluoroethylene, and silicone.

Examples of such thermosetting resin include unsaturated polyester resin, vinyl ester resin, epoxy resin, benzoxazine resin, phenol resin, urea resin, melamine resin, and polyimide resin. Modified forms of such resins and blends of two or more resins may also be used. Further, the thermosetting resins may be resins which are self-cured by heat or may be those contain a curing agent, a curing accelerator, or the like. The thermosetting resins also may be those in which a filler or the like is mixed for the purpose of improving heat resistance and mechanical properties.

There are no particular limitations on the volume content (Vf) of reinforcing fibers in the incised prepreg a and the incised prepreg c, which can be chosen as appropriate, but in order that the incised prepreg a exhibits sufficient mechanical properties, Vf=50 to 65% is preferable, and in order that the incised prepreg c exhibits sufficient flowability, Vf=40 to 60% is preferable. For the SMC or the like constituting the sheet substrate B also, the Vf is preferably as low as possible when sufficient flowability is to be exhibited, and a specific range thereof is preferably Vf=30 to 50%.

Regarding methods for producing the incised prepreg a and the incised prepreg c, that is, a method of forming a plurality of incisions that divide reinforcing fibers in a prepreg including unidirectionally oriented reinforcing fibers and a resin, they may be produced by pressing a prepreg against a rotary blade provided with a blade on the surface thereof, or may be produced by intermittently pressing a prepreg using a Thomson blade, or may be produced using a laser.

In the present invention, in the incised prepreg a and the incised prepreg c, it is preferable that substantially all of the reinforcing fibers in the incised prepreg be divided by incisions. The phrase that substantially all of the reinforcing fibers in the incised prepreg are divided by incisions means that continuous fibers accounting for 95% or more of the reinforcing fibers (continuous fibers) before being divided are divided by incisions.

As a method for confirming whether or not substantially all reinforcing fibers in an incised prepreg are divided by incisions, since it is impractical to confirm by measuring the entire area of the incised prepreg, confirmation is made by extracting a 1 cm-wide sample as a representative and considering reinforcing fibers having a length of 10 cm or more as continuous fibers. First, a small piece sized 1 cm by 1 cm of a single incised prepreg layer is cut out from an arbitrary position and then is cured, and a cross section thereof perpendicular to the fiber direction of the reinforcing fibers is ground, and an image of the cross section is obtained. Then, reinforcing fiber portions and resin portions are binarized by image processing, and the number (N1) of the reinforcing fibers included in the cross section is counted. Next, the incised prepreg is cut into a size of 20 cm by 1 cm such that the length in the fiber direction of the reinforcing fibers is 20 cm, and the resin is baked out at a high temperature (a baking out method). The temperature for baking out the resin varies depending on the resin type, and for example, it is 500° C. for an epoxy resin. Then, of the remaining reinforcing fibers, the number (N2) of reinforcing fibers having a length of 10 cm or more is counted. When N2 is 5% or less of N1, it is considered that continuous fibers in an amount of 95% of the continuous fibers before being divided are divided by incisions.

Preferred embodiments of the present invention include an embodiment where the average length of the incisions of the incised prepreg c constituting the sheet substrate C is 1.5 or more times the average length of the incisions of the incised prepreg a. In the fiber-reinforced plastic produced in the present invention, the sheet substrate C has an incised pattern in which the flowability is prioritized, but it is preferable that the sheet substrate C also have high mechanical properties as far as possible. Therefore, in a conceivable method, the flowability of the incised prepreg c is made higher than that of the incised prepreg a while the fiber lengths of the incised prepreg a and the incised prepreg c are made equal or almost equal. At this time, even when the incised prepreg a satisfies the condition 1 and the incised prepreg c satisfies the condition 2, the incised prepreg c can be made to have a higher flowability by adjusting the average length of the incisions formed in the incised prepreg c to 1.5 or more times the average length of the incisions formed in the incised prepreg a. More preferably, the average length of the incisions formed in the incised prepreg c is adjusted to 2.0 or more times the average length of the incisions formed in the incised prepreg a. The upper limit of the average length of the incisions formed in the incised prepreg c is not particularly limited, but a practical upper limit is 100 times the average length of the incisions formed in the incised prepreg a.

Preferred embodiments of the present invention include an embodiment where when a circle with a radius of 5 mm is extracted at an arbitrary position in the plane of the incised prepreg c, 13 or more incisions are included in the circle. The phrase that an incision is included in the circle refers to a state where the entire incision is included in the circle. In order to further improve the flowability of the incised prepreg c, it is effective to shorten the fiber length, but by dispersing incisions more finely while satisfying the condition 2. In addition to it, it is possible to improve the flowability while maintaining the orientation of the individual reinforcing fibers during flowing without significantly deteriorating mechanical properties. Further, by finely dispersing the incisions, the openings of the individual incisions can be reduced, and the surface quality of a resulting fiber-reinforced plastic can also be improved.

Figure 3:
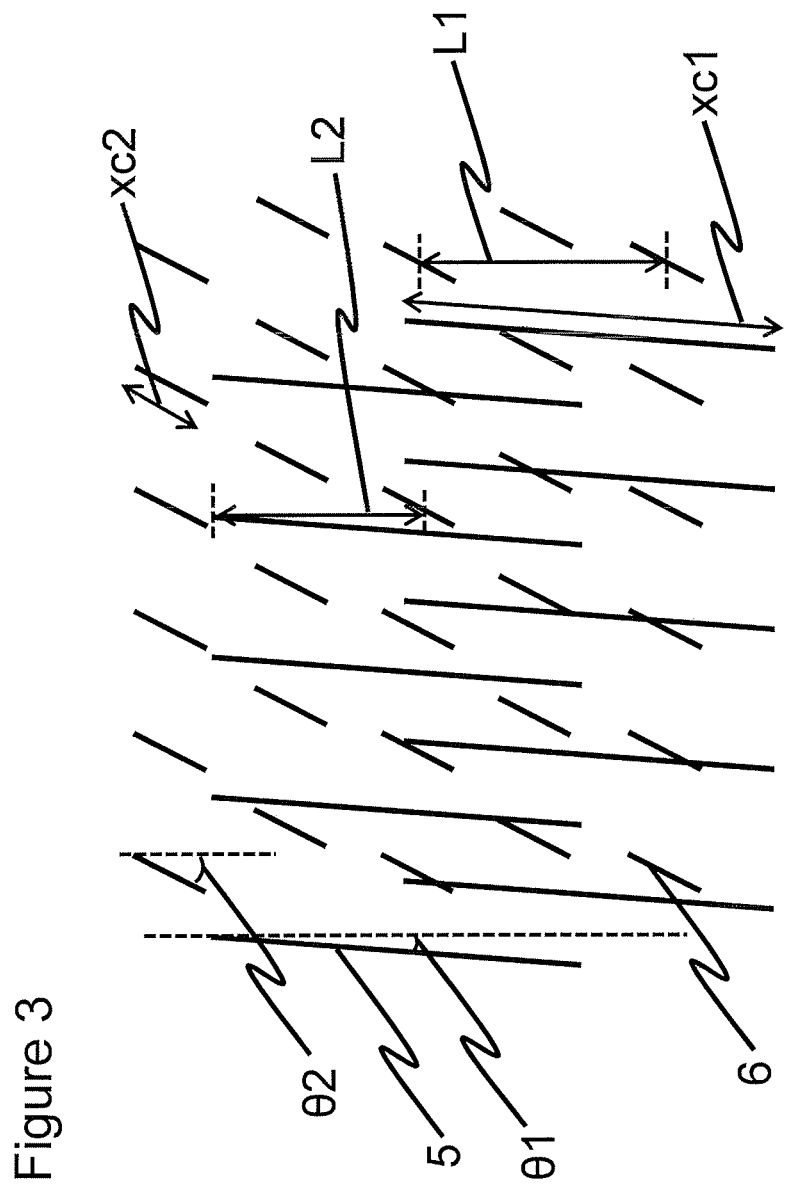
FIG. 3 is an example of an incised pattern of an incised prepreg c.

Preferred embodiments of the present invention include an embodiment where in the sheet substrate C, as shown in FIG. 3, incisions 1 (sign 5) and incisions 2 (sign 6) are formed in a incised prepreg c, and the incisions 1 form an angle θ1 with the fiber direction of reinforcing fibers, the absolute value of the angle θ1 satisfying $0° \leq \theta_1 < 10°$, and the average length xc1 (mm) of the incisions satisfies 5 mm≤xc1≤50 mm, and the incisions 2 form an angle θ2 with the fiber direction of reinforcing fibers, the absolute value of the angle θ2 satisfying $10° < \theta_2 \leq 45°$, and the average length xc2 (mm) of the incisions satisfies 0.5 mm≤xc2<5 mm, and substantially all reinforcing fibers in the incised prepreg c are divided by the incisions 1 or the incisions 2, and the length of the reinforcing fibers divided is 0.1 to 15 mm. There is a possibility that the fiber length is shorter than 0.1 mm in the vicinity of the intersections of the incisions 1 and the incisions 2, but in the present invention, the presence of reinforcing fibers shorter than 0.1 mm is considered negligible when such fibers account for less than 1% of the volume of all the reinforcing fibers contained in the incised prepreg c.

Regarding the method for confirming that the length of a reinforcing fiber is 0.1 to 15 mm, that can be confirmed using an image photographed using a digital microscope or the like as for the above-described average length of the reinforcing fibers. When reinforcing fibers are divided only by incisions 1 or incisions 2, the distance L1 between incisions adjacent along the fiber direction of the reinforcing fibers is measured, and as to reinforcing fibers divided by the incisions 1 and 2, the maximum value L2 of the lengths of the reinforcing fibers sandwiched between the incisions 1 and the incisions 2 is measured. L1 and L2 are each measured at ten positions, and when L1 and L2 are 15 mm or less, the length of the reinforcing fibers is considered to be 0.1 to 15 mm.

In order to improve the flowability of the incised prepreg c in which incisions 2 are formed without significant deterioration of mechanical properties, it is effective to form incisions 1 having an angle infinitely close to 0° with the fiber direction of the reinforcing fibers. In the incised prepreg c, the smaller the angle θ1, the smaller the decrease in mechanical properties from the prepreg before the incisions formation, and therefore, there occurs little decrease in mechanical properties from the incised prepreg c having only incisions 2 formed and the number of incisions formed can be increased by forming the incisions 1 in the incised prepreg in which the incisions 2 have been formed. Increasing the number of incisions formed leads to increase in the number of sites where reinforcing fibers adjoining via incisions slip, so that flowability is improved. A particularly preferable range of xc1 is 5 mm≤xc1≤10 mm. Although the incision 1 is effective even if it is an incision parallel to reinforcing fibers, it is particularly preferable to be an incision dividing reinforcing fibers, and it is preferable that $1° \leq \theta_1 \leq 10°$. The incisions 1 and the incisions 2 may be formed in separate steps to produce an incised prepreg c.

In the present invention, in addition to the sheet substrates A, the sheet substrate B, and the sheet substrate C, a resin sheet or a coating for improving flowability or appearance quality may be appropriately placed on the mold, and it is preferable to place them such that the sheet substrates A account for 50 volume % or more and 100 volume % or less when the total volume of the substrates placed on the mold is 100%. Since the sheet substrates A contain relatively long reinforcing fibers, they have high mechanical properties after curing. Thanks to inclusion of a large number of sheet substrates A, a fiber-reinforced plastic having high mechanical properties can be produced.

EXAMPLES

Hereafter, the present invention will be more specifically described by way of examples, but the present invention is not limited to the inventions described in the examples. In the following examples, sheet substrates A, sheet substrates B, and sheet substrates C were produced using "TORAYCA" (registered trademark) prepreg sheet P3052S-15 (reinforcing fiber: T700S, thermosetting resin: 2500, volumetric content of reinforcing fiber: 58%) (hereinafter, simply called "prepreg" means this prepreg sheet) as a base, and then the moldability evaluation 1, the moldability evaluation 2, and the moldability evaluation 3, which are described below, were carried out. The results obtained are summarized in Tables 1 and 2.

<Moldability evaluation 1>

Using a double-sided mold, sheet substrates A were placed as shown in FIG. 1(a) and a fiber-reinforced plastic was produced. In the placement step (A) of placing the sheet substrates A in the mold, rectangular sheet substrates A were cut out, and they were placed on the lower mold heated at 140° C. in advance such that an overlapping portion where sheet substrates A overlapped and a non-overlapping portion where sheet substrates A did not overlap were formed relative to the mold surface sized 100 mm by 100 mm as shown in FIG. 1(b). At this time, of the two sheet substrates A constituting the overlapping portion by overlapping together, the fiber direction of the reinforcing fibers in the incised prepreg a located on the surface on the overlapping portion of one sheet substrate A differed from the fiber direction of the reinforcing fibers in the incised prepreg a located on the surface of the overlapping portion of the other sheet substrate A, and both the fiber directions intersected. Then, the sheet substrates A were heated and pressed at a surface pressure of 3 MPa against the mold surfaces sized 100 mm by 100 mm, and after holding for 30 minutes, the product was released from the mold and, thus, a fiber-reinforced plastic was produced.

The resulting fiber-reinforced plastic was subjected to the evaluation of surface quality and flexural strength. In the method of evaluating the surface quality, using the thickness h1 of the part where the two sheet substrates A overlapped in the resulting fiber-reinforced plastic and the thickness h2 of the part where the sheet substrates A did not overlap, the thickness ratio h1/h2 was calculated and evaluated. A thickness ratio value closer to 1 indicates that the irregularities at the joining portion are smaller, and the product can be evaluated as having a better surface quality. In a table, the result is shown in the column of "surface quality".

Moreover, as to the flexural strength, the fiber-reinforced plastic was cut into a rectangle, which was subjected to a three-point bending test in accordance with JIS K7074 (enacted in 1988) and the flexural strength was measured. In a table, the result is shown in the column of "flexural evaluation".

<Moldability Evaluation 2>

Figure 4:
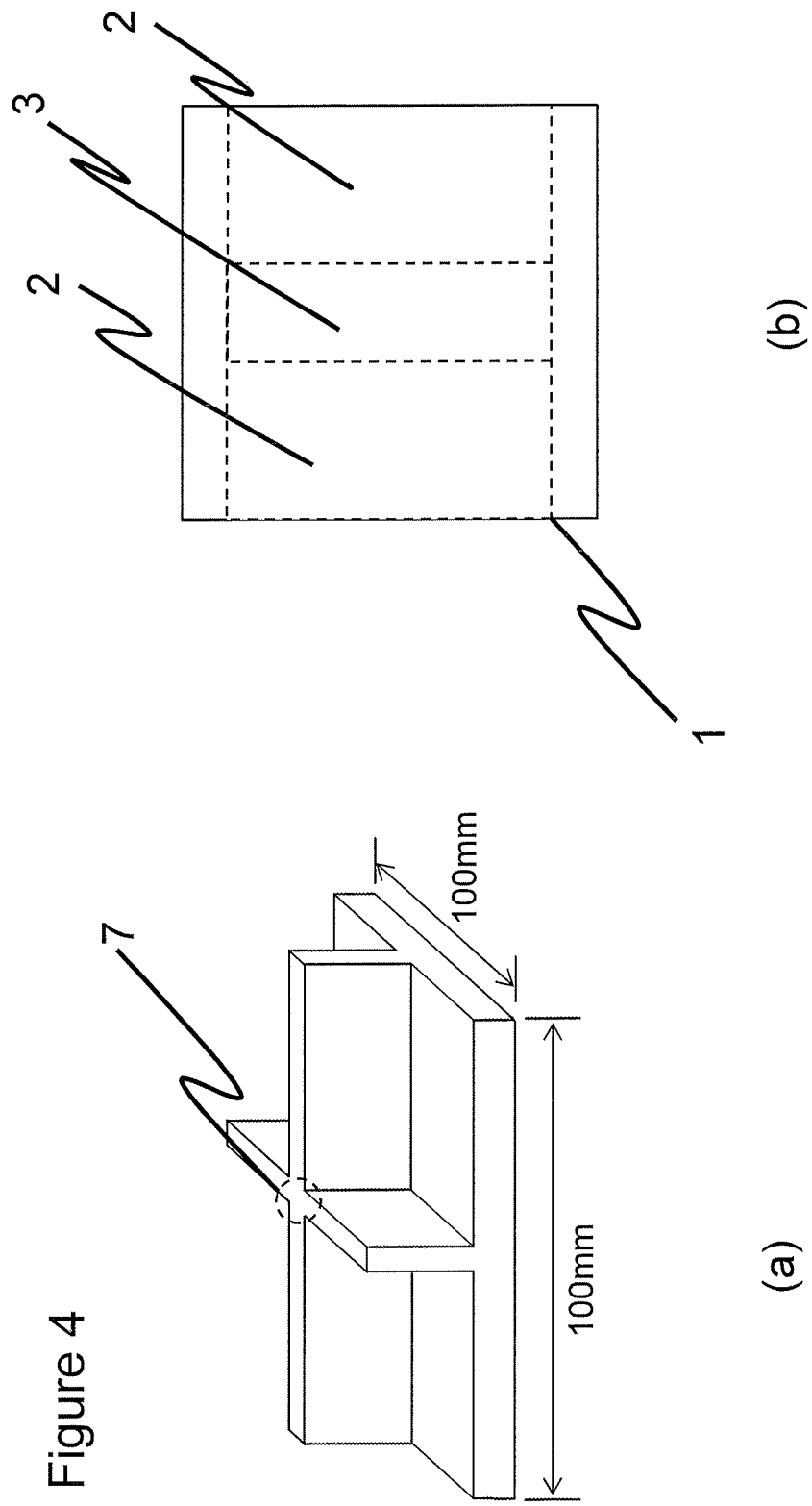
FIG. 4 is an example of shapes of fiber-reinforced plastics produced in Examples.

Using a double-sided mold, a fiber-reinforced plastic having the shape shown in FIG. 4(a) was produced. With the double-sided mold used, a 1.8 mm-thick cruciform rib having a height of up to 45 mm can be formed. In the placement step (A) of placing the sheet substrates A in the mold, two sheet substrates A sized 70 mm by 70 mm were cut out, and they were placed on the lower mold heated at 140° C. in advance such that an overlapping portion where sheet substrates A overlapped and a non-overlapping portion where sheet substrates A did not overlap were formed as shown in FIG. 4(b).

Each of Examples and Comparative Examples was carried out such that the total area of the overlapping portion and the non-overlapping portions accounts for 70% of the area of the mold surface unless otherwise specified. Similarly, unless otherwise specified in each of Examples and Comparative Examples, the ratio of the total area of the overlapping portion to the total area of the non-overlapping portions was 0.67. Similarly, unless otherwise specified, in each of Examples and Comparative Examples, of the two sheet substrates A constituting the overlapping portion by overlapping together, the fiber direction of the reinforcing fibers in the incised prepreg a located on the surface on the overlapping portion of one sheet substrate A differed from the fiber direction of the reinforcing fibers in the incised prepreg a located on the surface of the overlapping portion of the other sheet substrate A, and both the fiber directions intersected.

Then, pressure was applied at a pressure of 6 MPa against the area of 100 mm by 100 mm by using a pressing machine, and after holding for 30 minutes, the product was released from the mold and, thus, a fiber-reinforced plastic was obtained. The height of the rib central portion (the area with sign 7) obtained was evaluated according to the following five-stage criteria.

S: The rib containing carbon fibers had a height of 40 mm or more.

A: The rib containing carbon fibers had a height of 30 mm or more and less than 40 mm.

B: The rib containing carbon fibers had a height of 20 mm or more and less than 30 mm.

C: The rib containing carbon fibers had a height of 10 mm or more and less than 20 mm.

D: The rib containing carbon fibers had a height of less than 10 mm.

<Moldability Evaluation 3>

Figure 5:
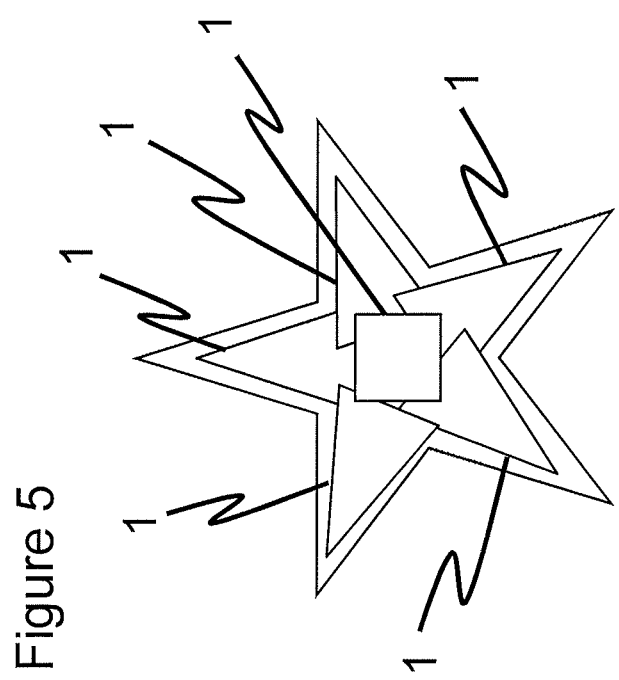
FIG. 5 is an example of a placement of substrates placed in Examples.

Using a double-sided mold, a star-shaped fiber-reinforced plastic as shown in FIG. 5 was produced. In the placement step (A) of placing the sheet substrates A in the mold, the sheet substrates A were placed on the lower mold heated at 140° C. in advance such that an overlapping portion where sheet substrates A overlapped and a non-overlapping portion where sheet substrates A did not overlap were formed as shown by sign 1 in FIG. 5.

At this time, each of Examples and Comparative Examples was carried out such that the total area of the overlapping portion and the non-overlapping portions accounts for 90% of the area of the mold surface unless otherwise specified. Similarly, unless otherwise specified in each of Examples and Comparative Examples, the ratio of the total area of the overlapping portion to the total area of the non-overlapping portions was 0.2. Similarly, unless otherwise specified, in each of Examples and Comparative Examples, of the two sheet substrates A constituting the overlapping portion by overlapping together, the fiber direction of the reinforcing fibers in the incised prepreg a located on the surface on the overlapping portion of one sheet substrate A differed from the fiber direction of the reinforcing fibers in the incised prepreg a located on the surface of the overlapping portion of the other sheet substrate A, and both the fiber directions intersected.

Then, pressure was applied at a pressure of 6 MPa against the area of the mold by using a pressing machine, and after holding for 30 minutes, the product was released from the mold and, thus, a fiber-reinforced plastic was obtained. The quality of the fiber-reinforced plastic obtained was evaluated according to the following four-stage criteria.

A: The substrates were loaded to the edges of the mold, and a fiber-reinforced plastic having good surface quality was obtained.

B: The substrates were loaded to the edges of the mold, but irregularities were generated on the surface.

C: The sheet substrates A were joined but were not loaded to the edges of the mold.

D: The sheet substrates A were not joined together.

Example 1

Incised prepregs a were produced by forming incisions in prepregs using a blade such that the incisions had a length of 1 mm, the incisions formed an angle of 14° with respect to the fiber direction of the fibers, and the average length of all reinforcing fibers was 25 mm. The average length xa of the incisions was 1 mm, the average length ya of the reinforcing fibers divided by the incision was 25 mm, and xa and ya satisfied the condition 1 of ya>6.0xa+10. The incised prepregs a were laminated with a lamination structure of $[+45°/0°/-45°/90°]_s$ and were cut into a size of 60 mm by 50 mm to obtain sheet substrates A. Using the sheet substrates A, the moldability evaluation 1 was carried out.

After a placement step (A) of placing two sheet substrates A such that the individual sheet substrates A formed an overlapping portion where they partially overlapped and non-overlapping portions where they did not overlap, a molding step was executed to produce a fiber-reinforced plastic. At this time, the area of the overlapping portion and the non-overlapping portions accounted for 50% of the area of the mold surface. The ratio of the total of the area of the overlapping portion to the total of the area of the non-overlapping portions was 0.25. In the placement step (A), no materials other than the sheet substrates A were placed.

The resulting fiber-reinforced plastic had a larger thickness at the overlapping portion of the sheet substrates A and the thickness ratio h1/h2 was 1.23.

When the resulting fiber-reinforced plastic was cut into a rectangular shape and then was subjected to a flexural evaluation, it was found that the flexural strength was 487.2 MPa.

Example 2

A fiber-reinforced plastic was produced and the moldability evaluation 1 was carried out in the same manner as in Example 1 except that the average length of the incisions formed in the incised prepregs a was 3 mm. At this time, the average length xa of the incisions was 3 mm, the average length ya of the reinforcing fibers divided by the incisions was 25 mm, and therefore xa and ya did not satisfy the condition 1 of ya>6.0xa+10. The resulting fiber-reinforced plastic had a larger thickness at the overlapping portion of the sheet substrates A, and the thickness ratio h1/h2 was 1.12.

When the resulting fiber-reinforced plastic was cut into a rectangular shape and then was subjected to a flexural evaluation, it was found that the flexural strength was 501.4 MPa.

Example 3

A fiber-reinforced plastic was produced and the moldability evaluation 1 was carried out in the same manner as in Example 1 except that the dimensions of the sheet substrates A were changed to 70 mm by 70 mm. At this time, the area of the overlapping portion and the non-overlapping portions accounted for 70% of the area of the mold surface. The ratio of the total of the area of the overlapping portion to the total of the area of the non-overlapping portions was 0.67. The resulting fiber-reinforced plastic was subjected to the moldability evaluation 1.

The resulting fiber-reinforced plastic had a flat joining portion and the thickness ratio h1/h2 was 1.01.

When the resulting fiber-reinforced plastic was cut into a rectangular shape and then was subjected to a flexural evaluation, it was found that the flexural strength was 661.2 MPa.

Example 4

A fiber-reinforced-plastic was produced and the moldability evaluation 1 was carried out in the same manner as in Example 1 except that the dimensions of the sheet substrates A were changed to 70 mm by 50 mm. At this time, the area of the overlapping portion and the non-overlapping portions accounted for 50% of the area of the mold surface. The ratio of the total of the area of the overlapping portion to the total of the area of the non-overlapping portions was 0.67. The resulting fiber-reinforced plastic was subjected to the moldability evaluation 1.

The resulting fiber-reinforced plastic had a larger thickness at the overlapping portion of the sheet substrates A, and the thickness ratio h1/h2 was 1.24.

When the resulting fiber-reinforced plastic was cut into a rectangular shape and then was subjected to a flexural evaluation, it was found that the flexural strength was 603.3 MPa.

Example 5

A fiber-reinforced plastic was produced and the moldability evaluation 1 was carried out in the same manner as in Example 1 except that circular holes were formed in the incised prepregs a. Circular holes with a radius of 3 mm were formed such that the holes were arranged in a line in the area where the two sheet substrates A formed together the overlapping portion. At this time, the total area of the holes was 10% of the area of the incised prepregs a including the holes. The resulting fiber-reinforced plastic was subjected to the moldability evaluation 1.

In the resulting fiber-reinforced plastic, there was almost no recognizable change in thickness between the overlapping portion of the sheet substrates A and the non-overlapping portions and the thickness ratio h1/h2 was 1.03.

When the resulting fiber-reinforced plastic was cut into a rectangular shape and then was subjected to a flexural evaluation, it was found that the flexural strength was 344.7 MPa.

Example 6

In the placement step (A), the same resin as the resin contained in the prepreg used was applied to one surface of each of the sheet substrates A which are the same as those used in Example 1, and the two sheet substrates were placed on a mold while overlapping the resin-applied surfaces of the sheet substrates A. A fiber-reinforced plastic was produced and the moldability evaluation 1 was carried out in the same manner as in Example 1 except the foregoing description. At this time, when the total volume of the substrates to be placed in the mold was taken as 100%, 40% by volume was accounted for by the sheet substrates A. The resulting fiber-reinforced plastic was subjected to the moldability evaluation 1.

The resulting fiber-reinforced plastic had a flat joining portion and the thickness ratio h1/h2 was 1.05.

When the resulting fiber-reinforced plastic was cut into a rectangular shape and then was subjected to a flexural evaluation, it was found that the flexural strength was 189.6 MPa.

Example 7

The incised prepregs a were laminated with a lamination structure of $[+45°/0°/-45°/90°]_s$ to obtain sheet substrates A. Incised prepregs a were produced by forming incisions in prepregs using a blade such that the incisions had a length of 1 mm, the incisions formed an angle of 14° with respect to the longitudinal direction of the sheet substrates A, and the average length of all reinforcing fibers was 25 mm. At this time, the average length xa of the incisions was 1 mm, the average length ya of the reinforcing fibers divided by the incisions was 25 mm, and therefore xa and ya satisfied the condition 1 of ya>6.0xa+10. No holes were formed in the incised prepregs a. Using the sheet substrates A, the moldability evaluation 2 and the moldability evaluation 3 were carried out. In the placement step (A), no materials other than the sheet substrates A were placed.

In the moldability evaluation 2, there was formed a 11 mm-high rib. In the moldability evaluation 3, the sheet substrates A were joined to each other and the substrates were loaded to the edges of the mold, but irregularities were observed on the surface. Moreover, since the shape of the sheet substrates was a simple shape, the substrates were able to be produced with a high yield and in a short time.

Example 8

The moldability evaluation 2 and the moldability evaluation 3 were carried out in the same manner as in Example 7 except that the average length of the incisions formed in the incised prepregs a was 3 mm. At this time, the average length xa of the incisions was 3 mm, the average length ya of the reinforcing fibers divided by the incisions was 25 mm, and therefore xa and ya did not satisfy the condition 1 of ya>6.0xa+10. In the moldability evaluation 2, there was formed a 13 mm-high rib. In the moldability evaluation 3, the sheet substrates A were joined to each other and the substrates were loaded to the edges of the mold, but irregularities were observed on the surface. Moreover, since the shape of the sheet substrates was a simple shape, the substrates were able to be produced with a high yield and in a short time.

Example 9

After the placement step (A) of placing the same sheet substrates A as those used in Example 7 was carried out, the placement step (B) of placing an SMC as a sheet substrate B on the mold was carried out, the SMC having been produced by cutting out a chopped strand sized 25 mm in the longitudinal direction and 5 mm in width from a prepreg, heating it to 70° C. in the mold, and then vacuum sucking. Then, heating and pressing were performed, and the moldability evaluation 2 and the moldability evaluation 3 were carried out.

In the moldability evaluation 2, a sheet substrate B having a square shape sized 90 mm by 90 mm and a thickness of 3 mm was placed. At this time, when the total volume of the substrates placed in the mold was taken as 100%, 52% by volume was accounted for by the sheet substrates A. As a result of the moldability evaluation 2, there was formed a 21 mm-high rib. In the moldability evaluation 3, a sheet substrate B having the same shape as that of the mold and a thickness of 3 mm was placed. At this time, when the total volume of the substrates placed in the mold was taken as 100%, 50% by volume was accounted for by the sheet substrates A. As a result of the moldability evaluation 3, the substrates were loaded to the edges of the mold, and no irregularities were found on the surface of a fiber-reinforced plastic.

Example 10

After the placement step (A) of placing the same sheet substrates A as those used in Example 7 was carried out, the placement step (C) of placing a sheet substrate C prepared by laminating incised prepregs c in a lamination structure of $[0/90]_3$ and into a thickness of 0.9 mm was carried out. Then, heating and pressing were performed, and the moldability evaluation 2 and the moldability evaluation 3 were carried out. Incised prepregs c were produced by forming incisions in sheet prepregs using a blade such that the incisions had an average length of 1 mm, the incisions formed an angle of 14° with respect to the fiber direction of the reinforcing fibers, and the average length of all reinforcing fibers was 12.5 mm. The average length xc of the incisions was 1 mm, the average length yc of the reinforcing fibers divided by the incision was 12.5 mm, and xc and yc satisfied the condition 2 of yc 6.0≤xc+10. Moreover, when a circle with a radius of 5 mm was extracted at an arbitrary position in the plane of the incised prepreg c, 13 or more incisions were included in the circle.

In the moldability evaluation 2, a sheet substrate C having a square shape sized 90 mm by 90 mm and a thickness of 1 mm was placed. At this time, when the total volume of the substrates placed in the mold was taken as 100%, 52% by volume was accounted for by the sheet substrates A. As a result of the moldability evaluation 2, there was formed a 35 mm rib. In the moldability evaluation 3, a sheet substrate C having the same shape as that of the mold and a thickness of 1 mm was placed. At this time, when the total volume of the substrates placed in the mold was taken as 100%, 50% by volume was accounted for by the sheet substrates A. As a result of the moldability evaluation 3, the substrates were loaded to the edges of the mold, and no irregularities were found on the surface of a fiber-reinforced plastic.

Example 11

A fiber-reinforced plastic was produced and the moldability evaluation 2 and the moldability evaluation 3 were carried out in the same manner as in Example 10 except that the average length of the incisions formed in the incised prepreg c used in Example 10 was 3 mm and the average length of all reinforcing fibers was 25 mm. At this time, the average length xc of the incisions of the incised prepreg c was 3 mm, the average length yc of the reinforcing fibers divided by the incisions was 25 mm, and xc and yc satisfied the condition 2 of yc 6.0≤xc+10, and the average length of the incisions of the incised prepreg c was 3 times the average length of the incisions of the incised prepregs a.

In the moldability evaluation 2, there was formed a 27 mm rib. In the moldability evaluation 3, the substrates were loaded to the edges of the mold, and no irregularities were found on the surface of a fiber-reinforced plastic.

Example 12

Although the incised prepreg c used in Example 10 had incisions 2 which formed an angle θ2 with the fiber direction of reinforcing fibers, the absolute value of the angle satisfying 10°<θ2≤45°, and which had an incision length xc2 satisfying 0.5 mm≤xc2<5 mm, incisions 1 which formed an angle θ1 of 2° with the fiber direction of reinforcing fibers, the angle satisfying 0°≤θ1<10°, and which had an average incision length xc1 being 20 mm and satisfying 5 mm≤xc1≤50 mm and which were arranged at intervals of 25 mm with respect to the fiber direction of the reinforcing fibers were further formed in an incised prepreg c by using a blade such that 50% of the reinforcing fibers contained in the incised prepreg c were divided by the incisions 1. The average length of the reinforcing fibers contained in the newly produced incised prepreg c satisfied 0.1 to 15 mm. Moreover, the average length of the incisions was 1.2 mm. The moldability evaluation 2 and the moldability evaluation 3 were performed in the same manner as in Example 10 except for the foregoing descriptions.

In the moldability evaluation 2, there was formed a 42 mm rib. In the moldability evaluation 3, the substrates were loaded to the edges of the mold, and no irregularities were found on the surface of a fiber-reinforced plastic.

Comparative Example 1

A fiber-reinforced plastic was produced and the moldability evaluation 1 was carried out in the same manner as in Example 1 except that prepregs in which no incisions had been formed were used as the prepregs to constitute the sheet substrates A.

The resulting fiber-reinforced plastic had a larger thickness at the overlapping portion of the sheet substrates A, and the thickness ratio h1/h2 was 1.20.

When the resulting fiber-reinforced plastic was cut into a rectangular shape and then was subjected to a flexural evaluation, it was found that the flexural strength was 320.8 MPa.

Comparative Example 2

A fiber-reinforced plastic was produced and the moldability evaluation 1 was carried out in the same manner as in Example 1 except that when the sheet substrates A were placed on the mold in the placement step (A), they were placed on the mold without forming any overlapping portions.

The resulting fiber-reinforced plastic was broken and separated at its joining portion at the time of releasing from the mold. For this reason, a flexural evaluation was not performed.

Comparative Example 3

A fiber-reinforced plastic was produced and the moldability evaluation 1 was carried out in the same manner as in Example 1 except that the dimensions of the sheet substrates A were changed to 60 mm by 10 mm. At this time, the area of the overlapping portion and the non-overlapping portions accounted for 10% of the area of the mold surface.

The resulting fiber-reinforced plastic had a larger thickness at the overlapping portion of the sheet substrates A, and the thickness ratio h1/h2 was 1.19 times. In addition, the substrates were not loaded to the edges of the mold. For this reason, a flexural evaluation was not performed.

Comparative Example 4

The moldability evaluation 2 and the moldability evaluation 3 were carried out in the same manner as in Example 1 except that prepregs in which no incisions had been formed were used as the prepregs to constitute the sheet substrates A.

In the moldability evaluation 2, there was formed a 5 mm rib. Further, in the moldability evaluation 3, although the sheet substrates A were joined, they were not loaded to the edges of the mold.

Comparative Example 5

The moldability evaluation 2 and the moldability evaluation 3 were carried out in the same manner as in Example 7 except that when the sheet substrates A were placed on the mold in the placement step (A), they were placed on the mold without forming any overlapping portions.

In the moldability evaluation 2, there was formed a 9 mm-high rib. Further, in the moldability evaluation 3, the fiber-reinforced plastic was broken at the stage of releasing it from the mold, so that the sheet substrates A were not joined.

Comparative Example 6

The moldability evaluation 2 and the moldability evaluation 3 were carried out in the same manner as in Example 7 except that only one sheet substrate A was placed in the placement step (A).

In the moldability evaluation 2, there was formed a 10 mm rib. Further, in the moldability evaluation 3, the substrates were loaded to the edges of the mold, and a fiber-reinforced plastic having no irregularities on the surface was obtained. However, since the sheet substrate was star-shaped, the sheet substrate was not able to be produced with high yield and it took much time, so that the productivity was poor.

TABLE 1

|  | Flexural evaluation (MPa) | Thickness ratio |
|---|---|---|
| Example 1 | 487.2 | 1.23 |
| Example 2 | 501.4 | 1.12 |
| Example 3 | 661.2 | 1.01 |
| Example 4 | 603.3 | 1.24 |
| Example 5 | 344.7 | 1.03 |
| Example 6 | 189.6 | 1.05 |
| Comparative Example 1 | 320.8 | 1.21 |
| Comparative Example 2 | — | — |
| Comparative Example 3 | — | 1.19 |

TABLE 2

|  | Moldability evaluation 2 | Moldability evaluation 3 |
|---|---|---|
| Example 7 | C | B |
| Example 8 | C | B |
| Example 9 | B | A |
| Example 10 | A | A |
| Example 11 | B | A |
| Example 12 | S | A |
| Comparative Example 4 | D | C |
| Comparative Example 5 | D | D |
| Comparative Example 6 | C | A |

DESCRIPTION OF REFERENCE SIGNS

1: Sheet substrate A
2: Non-overlapping portion
3: Overlapping portion
4: Sheet substrate B or sheet substrate C
5: Incision 1
6: Incision 2
7: Rib central portion

The invention claimed is:

1. A method for producing a fiber-reinforced plastic using a sheet substrate A,
the sheet substrate A being a substrate including one or more sheets of incised prepreg a,
the incised prepreg a being a prepreg including unidirectionally oriented reinforcing fibers and a resin and having a plurality of incisions dividing the reinforcing fibers formed in the prepreg,
the method for producing a fiber-reinforced plastic comprising a placement step (A) of placing a plurality of sheet substrates A in a mold such that each of the sheet substrates A forms an overlapping portion in which the sheet substrate A overlaps one or more other sheet substrates A and a non-overlapping portion in which the sheet substrate A does not overlap any other sheet substrates A, and a molding step of heating and pressing the plurality of sheet substrates A, and
a total area of the overlapping portion and the non-overlapping portion is 50 to 100% relative to the area of a mold surface;
wherein:
the ratio of the total of the area of the overlapping portion to the total of the area of the non-overlapping portion ("the total of the area of the overlapping portion"/"the total of the area of the non-overlapping portion") is 0.05 to 0.8;
there is no empty space between the overlapping portion to be bonded; and
the overlapping portion and the non-overlapping portion comprise unidirectional fibers.

2. The method for producing a fiber-reinforced plastic according to claim 1, wherein the average length xa (mm) of the incisions of the incised prepreg a and the average length ya (mm) of the reinforcing fibers divided by the incisions of the incised prepreg a satisfy ya>6.0xa+10.

3. The method for producing a fiber-reinforced plastic according to claim 1, wherein four or more sheet substrates A are placed in the placement step (A).

4. The method for producing a fiber-reinforced plastic according to claim 1, wherein the sheet substrates A are in a square or rectangular shape.

5. The method for producing a fiber-reinforced plastic according to claim 1, wherein the incised prepreg a has a plurality of holes,
and the total area of the holes accounts for 10 to 50% of the area of the incised prepreg a including the holes.

6. The method for producing a fiber-reinforced plastic according to claim 1, wherein of the two sheet substrates A constituting the overlapping portion by overlapping together, the fiber direction of the reinforcing fibers in the incised prepreg a located on the surface on the overlapping portion of one sheet substrate A differs from the fiber direction of the reinforcing fibers in the incised prepreg a located on the surface of the overlapping portion of the other sheet substrate A, and both the fiber directions intersect.

7. The method for producing a fiber-reinforced plastic according to claim 1, wherein the incised prepreg a contained in the sheet substrates A satisfies condition 1 and the method is a method for producing a fiber-reinforced plastic further comprising a placement step (B) of placing a sheet substrate B on the mold;
the sheet substrate B is a substrate including randomly oriented reinforcing fibers and a resin; and
the sheet substrate B is also heated and pressed in the molding step,
(Condition 1)
the average length xa (mm) of the incisions and the average length ya (mm) of the reinforcing fibers divided by the incisions satisfy ya>6.0xa+10.

8. The method for producing a fiber-reinforced plastic according to claim 1, wherein the incised prepreg a contained in the sheet substrates A satisfies condition 1 and the method is a method for producing a fiber-reinforced plastic further comprising a placement step (C) of placing a sheet substrate C on the mold;
the sheet substrate C is a substrate including one or more incised prepregs c;
the incised prepregs c is a prepreg including unidirectionally oriented reinforcing fibers and a resin and having a plurality of incisions dividing the reinforcing fibers formed in the prepreg and satisfy the following condition 2; and
the sheet substrate C is also heated and pressed in the molding step,
(Condition 1)
the average length xa (mm) of the incisions and the average length ya (mm) of the reinforcing fibers divided by the incisions satisfy ya>6.0xa+10,
(Condition 2)
the average length xc (mm) of the incisions and the average length yc (mm) of the reinforcing fibers divided by the incisions satisfy yc≤6.0xc+10.

9. The method for producing a fiber-reinforced plastic according to claim 8, wherein the average length of the incisions of the incised prepregs c is 1.5 times or more the average length of the incisions of the incised prepregs a.

10. The method for producing a fiber-reinforced plastic according to claim 8, wherein when a circle with a radius of 5 mm located at an arbitrary position in the plane of the incised prepregs c is extracted, 13 or more incisions are included in the circle.

11. The method for producing a fiber-reinforced plastic according to claim 9, wherein
incisions 1 and incisions 2 are formed in the incised prepreg c,
with the incisions 1, the absolute value of an angle θ1 formed with the fiber direction of the reinforcing fibers satisfies $0° \leq \theta 1 < 10°$, and the average length xc1 (mm) of the incisions satisfies 5 mm≤xc1≤50 mm, with the incisions 2, the absolute value of an angle θ2 formed with the fiber direction of the reinforcing fibers satisfies $10° < \theta 2\ 45°$, and the average length xc2 (mm) of the incisions satisfies 0.5 mm≤xc2<2 mm, substantially all reinforcing fibers contained in the incised prepreg c are divided by the incisions 1 or incisions 2, and the length of the divided reinforced fibers is 0.1 to 15 mm.

12. The method for producing a fiber-reinforced plastic according to claim 1, wherein when the total volume of the substrates placed on the mold is taken as 100%, 50% by volume or more and 100% by volume or less is accounted for by the sheet substrates A.

13. The method for producing a fiber-reinforced plastic according to claim 1, wherein a ratio of a thickness h1 derived from the overlapping portion to a thickness h2 derived from the non-overlapping portion, h1/h2, is from 1.01 to 1.24.

* * * * *

UNITED STATES PATENT AND TRADEMARK OFFICE
CERTIFICATE OF CORRECTION

| | | |
|---|---|---|
| PATENT NO. | : 11,872,773 B2 | Page 1 of 1 |
| APPLICATION NO. | : 16/482436 | |
| DATED | : January 16, 2024 | |
| INVENTOR(S) | : Kentaro Adachi, Yuzo Fujita and Takuya Karaki | |

It is certified that error appears in the above-identified patent and that said Letters Patent is hereby corrected as shown below:

In the Claims

Column 21, Line 5, In Claim 11, "$10°<θ2\ 45°$," should read -- $10°<θ2≤45°$, --.

Signed and Sealed this
Second Day of April, 2024

Katherine Kelly Vidal
*Director of the United States Patent and Trademark Office*